United States Patent
Shikama et al.

(10) Patent No.: US 9,297,961 B2
(45) Date of Patent: Mar. 29, 2016

(54) OPTICAL MODULE

(71) Applicant: NIPPON TELEGRAPH AND TELEPHONE CORPORATION, Tokyo (JP)

(72) Inventors: Kota Shikama, Atsugi (JP); Shuichiro Asakawa, Atsugi (JP); Atushi Aratake, Atsugi (JP); Ken Tsuzuki, Atsugi (JP); Shinji Mino, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 14/391,278

(22) PCT Filed: Apr. 24, 2013

(86) PCT No.: PCT/JP2013/002797
§ 371 (c)(1),
(2) Date: Oct. 8, 2014

(87) PCT Pub. No.: WO2013/161299
PCT Pub. Date: Oct. 31, 2013

(65) Prior Publication Data
US 2015/0331194 A1 Nov. 19, 2015

(30) Foreign Application Priority Data
Apr. 25, 2012 (JP) .................. 2012-100306

(51) Int. Cl.
*G02F 1/035* (2006.01)
*G02B 6/00* (2006.01)
(Continued)

(52) U.S. Cl.
CPC .............. *G02B 6/30* (2013.01); *G02B 6/12004* (2013.01); *G02B 6/125* (2013.01); *G02F 1/011* (2013.01);
(Continued)

(58) Field of Classification Search
CPC ........................................................ G02B 6/30
See application file for complete search history.

(56) References Cited

U.S. PATENT DOCUMENTS

| 7,352,924 B2* | 4/2008 | Gaebe | G02B 6/421 385/14 |
| 8,721,191 B2* | 5/2014 | Ishii | G02B 6/30 385/14 |

FOREIGN PATENT DOCUMENTS

| JP | H02-73207 | 3/1990 |
| JP | 3273490 | 4/1997 |

(Continued)

OTHER PUBLICATIONS

N. Mekada. et al, "Practical method of waveguide-to-fiber connection: direct preparation of waveguide endface by cutting machine and reinforcement using ruby beads," Applied Optics, pp. 5096-5102, vol. 29, No. 34, Dec. 1, 1990.

(Continued)

*Primary Examiner* — Omar R Rojas
(74) *Attorney, Agent, or Firm* — Workman Nydegger

(57) ABSTRACT

Even in the case of an optical module including a multi-chip integrated device, an optical module having a smaller size in consideration of the connection to optical fibers. An optical module having a package containing a multi-chip integrated device integrated with an optical functional element having both ends connected to planar lightwave circuits (PLCs) is provided. Each of the PLCs includes a folded waveguide for connecting a light waveguide formed in the optical functional element to optical fibers. The optical module comprises a connecting part connected to each of the PLCs for connecting the optical functional element to the optical fibers in the same face. The optical fibers are taken out from opposed surfaces of the package.

13 Claims, 17 Drawing Sheets

(51) Int. Cl.
*G02B 6/30* (2006.01)
*G02F 1/01* (2006.01)
*G02B 6/12* (2006.01)
*G02B 6/125* (2006.01)
*G02B 6/42* (2006.01)

(52) U.S. Cl.
CPC ............ *G02B 6/1203* (2013.01); *G02B 6/4267* (2013.01); *G02B 2006/1204* (2013.01); *G02B 2006/12119* (2013.01); *G02B 2006/12142* (2013.01); *G02F 2001/0113* (2013.01)

(56) References Cited

FOREIGN PATENT DOCUMENTS

JP   2011-191334   9/2011
WO   2012017644   2/2012

OTHER PUBLICATIONS

International Search Report in corresponding PCT App. No. PCT/JP2013/002797 dated May 21, 2013.
International Preliminary Report on Patentability in corresponding PCT Application No. PCT/JP2013/002797 dated Nov. 6, 2014.

* cited by examiner

124

OPTICAL MODULE

TECHNICAL FIELD

The present invention relates to an optical module. More specifically, the invention relates to a downsized optical module in consideration of the connection with optical fibers.

BACKGROUND ART

In recent years, with an increase of communication traffics, an optical transport network for a trunk line system has been required to transport a larger amount of data per one optical fiber. As a means for realizing this, attention has been paid to a multilevel modulation technique and a digital coherent detection technique to realize an improved frequency efficiency and a long-distance transmission. In the case of the multilevel modulation, a sophisticated optical modulator must be realized in consideration of a light phase.

An optical modulator is a basic device for optical communication for converting an electric signal to a light intensity signal. For example, the optical modulator has been generally required to provide a high speed, low loss, low power consumption, a small size, and high reliability. The method of realizing an optical modulator is classified to a direct modulation scheme and an external modulation scheme. A high-speed backbone network mainly uses the external modulation method from the viewpoints of high speed and a long-distance transmission. An optical modulator using the external modulation scheme consists of dielectric material such as $LiNbO_3$ (lithium niobate, hereinafter referred to as LN), semiconductor material or organic material with an electro-optic effect (hereinafter referred to as EO), and semiconductor material with an electroabsorption effect for example.

In the case of an optical modulator based on the multilevel modulation scheme, a passive optical circuit for multiplexing and demultiplexing polarization light is required because polarization light must be actively used. However, LN and semiconductor material have inferior optical characteristics to that of glass material from the viewpoints of low loss and connectivity to optical fibers, and then have a disadvantage in functional improvement.

As a device for realizing a passive optical circuit with a low loss, a planar lightwave circuit (hereinafter referred to as PLC) has been known in which silica glass is deposited on a Si substrate for example. Attention has been paid on a technique to use the superior optical characteristic of a silica-based PLC consisting of silica glass material to combine the silica-based PLC with dielectric material (e.g., LN) or an optical functional element consisting of semiconductor material or organic material for example.

In the case of the optical modulator as described above, an optical input/output section between a silica-based PLC chip and the optical functional element chip is appropriately connected and integrated. Two or more integrated chips are handled as one device (hereinafter a multi-chip integrated device) to connect optical fibers for performing the optical input/output to the exterior to the multi-chip integrated device. A typical example of the optical modulator using the multi-chip integrated device has been known as a modulator obtained by combining a silica-based PLC with an LN waveguide (hereinafter referred to as PLC-LN modulator).

Generally, an optical device such as an optical modulator is provided on a board in a communication equipment by being contained, from the viewpoints of reliability or a gas barrier property for example, in a package or a case consisting of metal or ceramic for example. Optical fibers and an optical device are generally adhered and fixed by a fiber connecting part consisting of glass for example. Optical fibers are connected to an optical device by penetrating through the pipe section of the package or case. Metal-coated fibers obtained by coating optical fibers with a metal coating are generally used to solder-seal the pipe section or to fix the optical fibers by adhesive agent for example.

In such an embodiment, optical fibers are fixed at two points of a connecting part of the optical device mounted in the package and a pipe section. Metal used for the package and glass material or semiconductor material used for the optical device have different thermal expansion coefficients. Thus, thermal stress depending on a temperature change causes tensile stress or compressive stress to the optical fibers, thus resulting in a changed position of the optical fibers. This has caused a disadvantage of reduced mechanical reliability and optical characteristic of the optical fibers themselves or the element for fixing the optical fibers.

In order to solve the above-described disadvantage, several researches have been made. For example, a structure has been suggested to buckle the optical fibers by a fixed length between the connecting part of the optical device and the pipe section in order to absorb the position variation (see for example Patent Literature 1). The multi-chip integrated device such as a PLC-LN modulator also has a similar structure in which the optical fibers are fixed at two points in the package. Two or more chips also have a difference in the thermal expansion coefficient, thus further deteriorating the disadvantageous thermal stress.

FIG. 1 illustrates the structure of a conventional PLC-LN modulator. A PLC-LN modulator 10 is configured so that an LN modulator 12 is contained in a package 11 in which both ends are connected to silica-based PLCs 13a and 13b. Optical fibers 14a and 14b are connected by fiber connecting parts 30a and 20b to silica-based PLCs 13a and 13b at connection end faces 21a and 21b and are fixed to pipe sections 22a and 22b of the package 11.

For example, these parts have thermal expansion coefficients (unit: $\times 10^{-6}$/K) as shown in the following table.

TABLE 1

| Part name | Thermal expansion coefficient |
| --- | --- |
| Stainless (SUS303) | 17.3 |
| Optical fibers | 0.75 |
| Fiber connecting part (glass) | 3.2 |
| Silica-based PLC | 2.5 |
| LN | 15.4 |

When stainless is used as package material in particular, a difference in thermal expansion coefficient between stainless and silica-based PLC is higher than that between a fiber connecting part consisting of glass and silica-based PLC. Thus, stress is concentrated on a connecting section between the optical fibers and a light waveguide on the silica-based PLC and a connecting section between the light waveguide on the silica-based PLC and the light waveguide of the LN modulator, thus resulting in a reduced mechanical reliability. Even when the LN modulator is compared with a package consisting of stainless, the former and the latter do not have a completely the same thermal expansion coefficient, resulting in the disadvantage of thermal stress unsolved.

In view of the above, the PLC-LN modulator 10 is configured so that the optical fibers are buckled between the two points for fixing the optical fibers 14a and 14b to absorb the above-described tensile stress or compressive stress due to thermal stress. Thus, the package interior requires fiber extra lengths 23a and 23b in order to achieve a fixed amount of buckling. For example, when the package 11 having a longitudinal direction of about 100 to 200 mm is used, the fiber extra lengths 23a and 23b must be about 8 to 15 mm, respectively.

Thus, in the case of the structure in which the optical fibers are buckled in the package, a space having a fixed length must be secured between the fiber connecting part and the pipe section, which may hinder a package size from being smaller. This distance can be reduced if the buckling amount of the optical fibers is increased. However, the increased buckling amount of the optical fibers has caused a disadvantage of an increased fiber bending loss or reduced reliability.

CITATION LIST

Patent Literature

Patent Literature 1: Japanese Patent Laid-Open No. H02-73207 (1990)
Patent Literature 2: Japanese Patent No. 3273490

Non-Patent Literature

Non-Patent Literature 1: N. Mekada. et al, "Practical method of waveguide-to-fiber connection: direct preparation of waveguide endface by cutting machine and reinforcement using ruby beads," APPLIED OPTICS, pp. 5096-5102, Vol. 29, No. 34, 1 Dec. 1990

SUMMARY OF INVENTION

It is an objective of the present invention to provide, even in the case of an optical module including a multi-chip integrated device, an optical module having a smaller size in consideration of the connection to optical fibers.

In order to achieve the objective as described above, the first embodiment provides an optical module having a package containing a multi-chip integrated device integrated with an optical functional element having both ends connected to planar lightwave circuits (PLCs), wherein each of the PLCs includes a folded waveguide for connecting a light waveguide formed in the optical functional element to optical fibers, wherein the optical module comprises a connecting part connected to each of the PLCs for connecting the optical functional element to the optical fibers in the same face, and wherein the optical fibers are taken out from opposed surfaces of the package.

The second embodiment provides an optical module having a package containing a multi-chip integrated device integrated with an optical functional element having both ends connected to planar lightwave circuits (PLCs), wherein a first PLC among the PLCs includes a folded waveguide for connecting a light waveguide formed in the optical functional element to optical fibers, wherein the optical module comprises a connecting part connected to the first PLC for connecting the optical functional element to the optical fibers in the same face, and wherein the optical fibers are taken out from the same surface of the package.

According to the third embodiment, in the second embodiment, a second PLC among the PLCs includes a folded waveguide for connecting two light waveguides formed in the optical functional element.

The sixth embodiment provides an optical module having a package containing a multi-chip integrated device integrated with an optical functional element connected to planar lightwave circuit (PLC), wherein the PLC includes a folded waveguide for connecting a light waveguide formed in the optical functional element to a first optical fiber, wherein the optical module comprises: a first connecting part connected to the PLC for connecting the optical functional element to the first optical fiber in the same face; and a second connecting part, in a face opposite to the face connected to the PLC of the optical functional element, for connecting a light waveguide formed in the optical functional element to a second optical fiber, and wherein the first and second optical fibers are taken out from the same surface of the package.

As described above, the present invention eliminates the need for a fiber extra length conventionally provided between a silica-based PLC and a pipe section, thus providing a shorter package in a longitudinal direction. Furthermore, improved workability can be achieved in the connection of the silica-based PLC to the optical fibers. In addition, the mechanical reliability can be easily secured against thermal variation.

DESCRIPTION OF EMBODIMENTS

Figure 1:
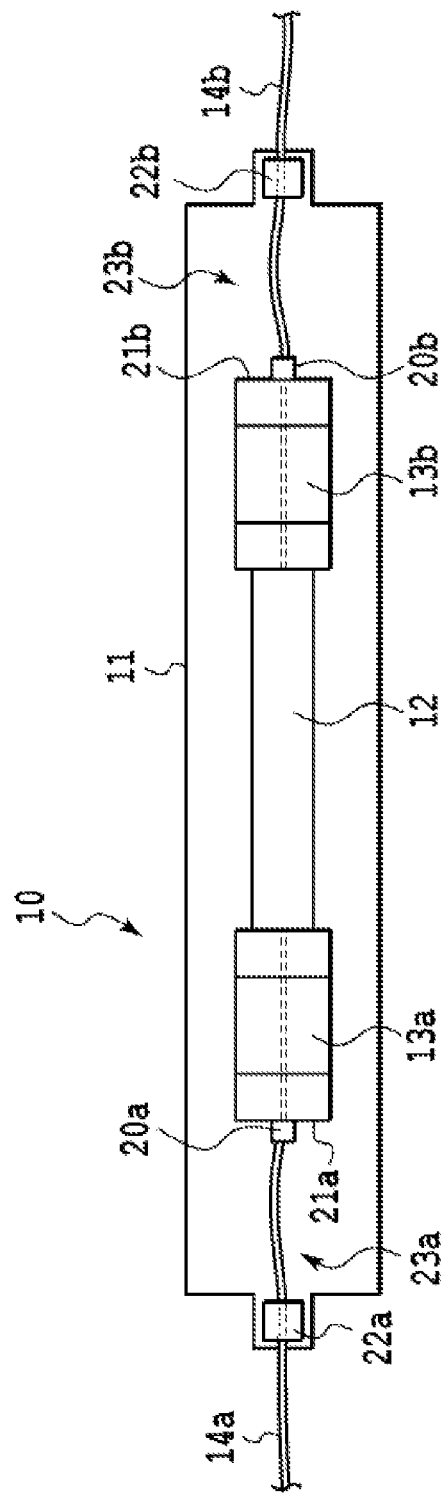
FIG. 1 illustrates the configuration of a conventional PLC-LN modulator.

The following section will describe an embodiment of the present invention in detail. In this embodiment, an optical module on which a PLC-LN modulator is mounted will be described. However, the invention also can be applied to any multi-chip integrated device integrated with an optical functional element in which both ends are connected to a planar lightwave circuit (PLC). The PLC also includes, as the above-described passive optical circuit, a multiplexer/demultiplexer or a polarized wave multiplexer/demultiplexer for example depending on the modulation method that is integrated between waveguides of the optical input/output section. One example is shown in the first embodiment. However, other embodiments omit the illustration for brief description. Furthermore, the LN modulator is attached with an electrode for performing a modulation operation in addition to the light waveguide for guiding an optical signal. They are also omitted in the drawings.

(First Embodiment)

Figure 2:
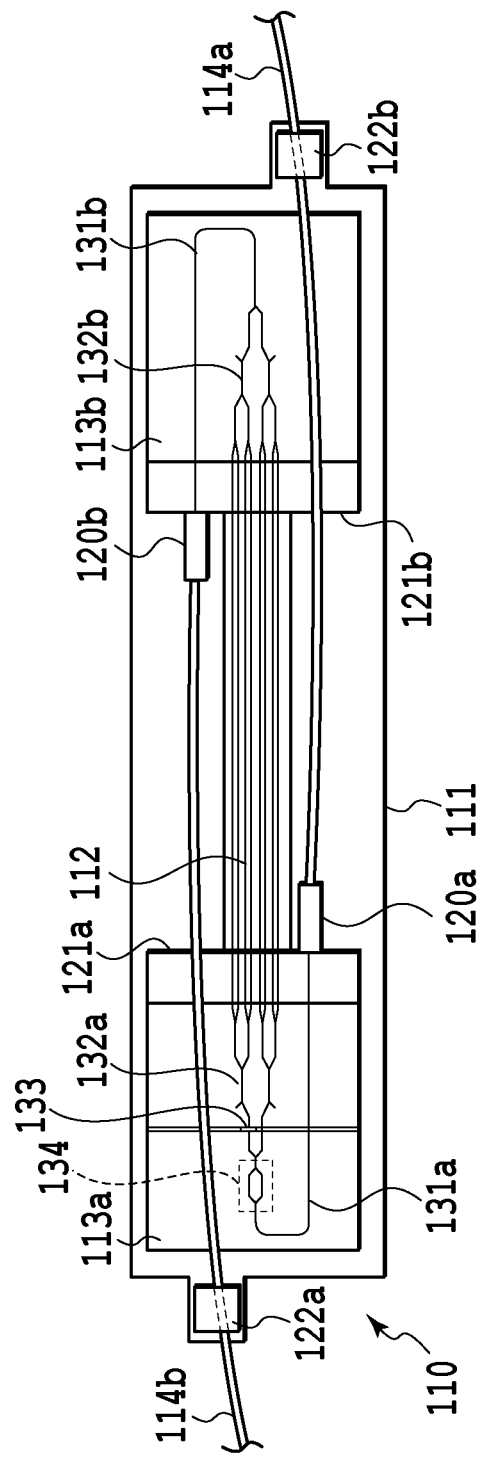
FIG. 2 illustrates the configuration of an optical module according to the first embodiment of the present invention.

FIG. 2 illustrates the configuration of an optical module according to the first embodiment of the present invention. The PLC-LN modulator 110 is a multi-chip integrated device that is integrated with the LN modulator 112 in which both ends are connected to silica-based PLCs 113a and 113b and that is contained in a package 111. The silica-based PLC 113a includes a multiplexer/demultiplexer 132a connected to a plurality of light waveguides formed in the LN modulator 112, a wave plate 133, and a polarization beam combiner 134. The output of the LN modulator 112 passes through these optical circuits and is connected by a folded waveguide 131a to optical fibers 114a. The silica-based PLC 113b includes a multiplexer/demultiplexer 132b and a folded waveguide 131b. The input from the optical fibers 114b passes through these optical circuits and is connected to the LN modulator 112. As a result, the fiber connecting parts 120a and 120b connected to the silica-based PLCs 113a and 113b connect the LN modulator 112 and the optical fibers 114a and 114b in the same connection end faces 121a and 121b.

The optical fibers 114a is fixed to a fiber connecting part 120a functioning as a connecting part to the silica-based PLC 113a and a farther pipe section 122b opposed thereto. The optical fiber 114b is fixed to the fiber connecting part 120b and a farther pipe section 122a opposed thereto. As a result, the optical fibers 114a and 114b are taken out from the respective surfaces opposed in the longitudinal direction of the package 111.

Conventionally, a silica-based PLC has been configured so that a connecting face of the PLC-LN modulator and a connecting face of the fiber connecting part are provided in separate faces opposed to each other (that exist at both ends of the PLC). According to the first embodiment, the connecting face of the LN modulator and the connecting face of the fiber connecting part are provided in the same face in the silica-based PLC, thereby providing remarkable acts and effects as shown below.

(1) The silica-based PLCs 113a and 113b include folded waveguides 131a and 131b having a radius of about R=2 to 3 mm. So, the silica-based PLC has a slightly-increased width. However, the fiber extra length, which has been conventionally provided between the silica-based PLC and the pipe section, is not required, thus providing a package having a reduced length in the longitudinal direction. For example, in one embodiment, a package of a length of about 140 mm can be reduced to have a length of about 120 mm.

(2) Conventionally, in order to minimize the size of the fiber connecting part, optical fibers have been connected by a small fiber connecting part integrated with a small capillary for example (see for example Patent Literature 1 and Non-Patent Literature 1). According to the first embodiment, the fiber connecting parts 120a and 120b have a length that does not influence on the length of the package, thus eliminating the need for the connection by a small part. Furthermore, the connection by a small part has required complicated design and mounting operation in order to secure reliability. However, the first embodiment can eliminate this requirement and can maintain reliability.

(3) The interior of the package 111 can include an increased distance between the connection points at two positions for fixing the optical fibers 114a and 114b, thus reducing the buckling amount of the optical fibers and the bending radius of buckling. Since the extra length can be sufficiently maintained as described above, the mechanical reliability can be secured against thermal variation.

(4) An end face of the silica-based PLC has been required to be subjected to a polishing processing in order to secure a low reflection and low loss at the connecting face between the LN modulator and the optical fibers. Since the first embodiment requires a polishing processing to be performed only on one face of the silica-based PLC, the manufacture cost also can be reduced.

As shown in the first embodiment, it was confirmed that the use of the LN modulator as an optical functional element could provide the package having a reduced length and could realize a multi-chip integrated device having a modulation function similar to that provided by the one having a conventional package size. Specifically, it was confirmed that not only a modulation function could be realized but also optical waveguide characteristics (e.g., optical loss, extinction ratio) similar to those of the one having a conventional package size could be realized.

In this embodiment, similar reduced length and modulation function can be achieved even when an LT modulator as an optical functional element is used that consists of dielectric material other than LN (e.g., LiTaO$_3$ (hereinafter referred to as "LT"). Furthermore, even when a semiconductor-based modulator such as GaN or InP is used, a similar action can be obtained while maintaining the high EO efficiency thereof. Even when organic EO material is used, a similar action can be obtained without causing a reduced high-speed response.

The optical functional element is not limited to the modulation function shown in the first embodiment and also may use, for example, an EO switch waveguide consisting of organic material or semiconductor material or a thermooptical switch waveguide consisting of Si for example. Even in these cases, the resultant package is allowed to have a reduced length in the longitudinal direction while maintaining the optical switch function.

(Second Embodiment)

Figure 3:
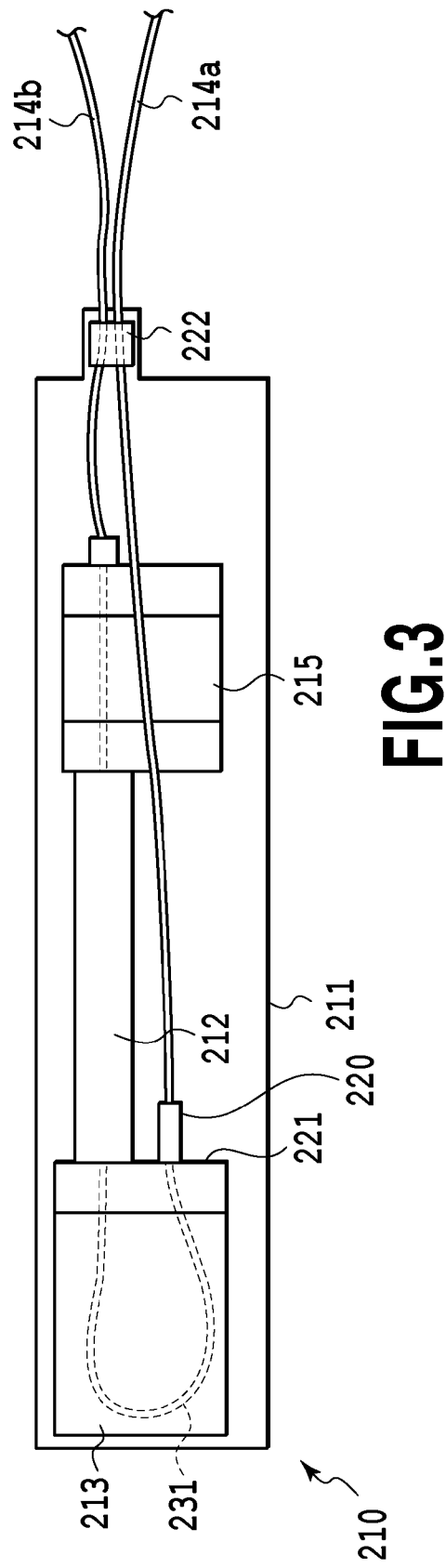
FIG. 3 illustrates the configuration of an optical module according to the second embodiment of the present invention.

FIG. 3 illustrates the configuration of an optical module according to the second embodiment of the present invention. A PLC-LN modulator 210 is a multi-chip integrated device that is integrated with the LN modulator 212 in which both ends are connected to silica-based PLCs 213 and 215 and that is contained in the package 211. The silica-based PLC 213 has a folded waveguide 231 for connecting a light waveguide formed in the LN modulator 212 to an optical fiber 214a. As a result, the fiber connecting part 220 connected to the silica-based PLC 213 connects the LN modulator 212 and the optical fiber 214a in the same connection end face 221. The silica-based PLC 215 has the same configuration as that of a conventional silica-based PLC.

In the second embodiment, the silica-based PLC in which the connecting face of the LN modulator and the connecting face of the fiber connecting part are provided in the same face was applied only to one silica-based PLC among two silica-based PLCs. The configuration as described above can provide a part of the actions (1)-(4) shown in the first embodiment.

Furthermore, according to the second embodiment, the pipe section 222 of the package 211 is provided at one position. Two optical fibers 1214a and 214b can be taken out from the same surface of the package 211. Thus, the PLC-LN modulator 210 can be installed in a board in a communication equipment while mitigating the mounting limitation.

(Third Embodiment)

Figure 4:
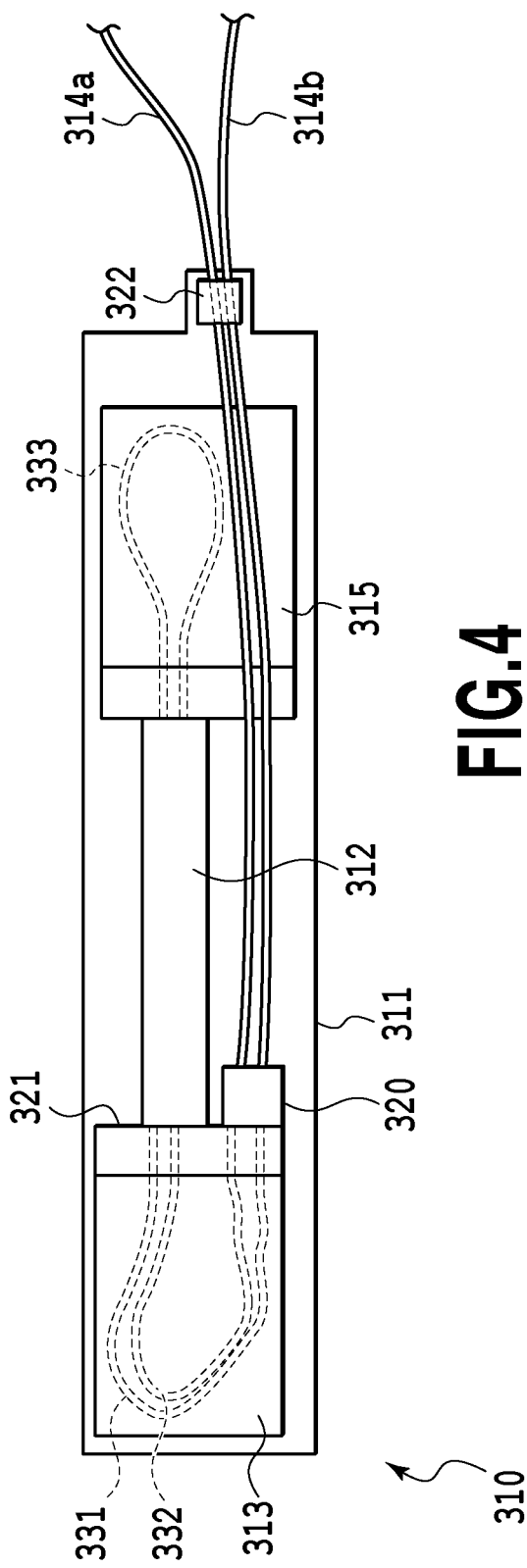
FIG. 4 illustrates the configuration of an optical module according to the third embodiment of the present invention.

FIG. 4 illustrates the configuration of the optical module according to the third embodiment of the present invention. The PLC-LN modulator 310 is a multi-chip integrated device that is integrated with the LN modulator 312 in which both ends are connected to the silica-based PLCs 313 and 315 and that is contained in the package 311. The silica-based PLC 313 includes folded waveguides 331 and 332 for connecting a light waveguide formed in the LN modulator 312 to the optical fibers 314a and 314b. The silica-based PLC 315 has a folded waveguide 333 for connecting two light waveguides formed in the LN modulator 312. As a result, the fiber connecting part 320 connected to the silica-based PLC 313 connects the LN modulator 312 to the optical fibers 314a and 314b in the same face 321.

The configuration as described above can provide the actions (1)-(4) shown in the first embodiment. Furthermore, as in the second embodiment, the two optical fibers 314a and 314b can be taken out from the same surface of the package 311, thus mitigating the mounting limitation during the installation in a board in the communication equipment.

Furthermore, the existence of the folded waveguide 333 of the silica-based PLC 315 allows, in order to carry out a modulation operation, the light waveguide of the LN modulator 312 to have a doubled effective action length. In addition, the silica-based PLC can be connected to an optical fiber at one fiber connecting part, thus providing a further-reduced manufacture cost.

(Fourth Embodiment)

Figure 5A:
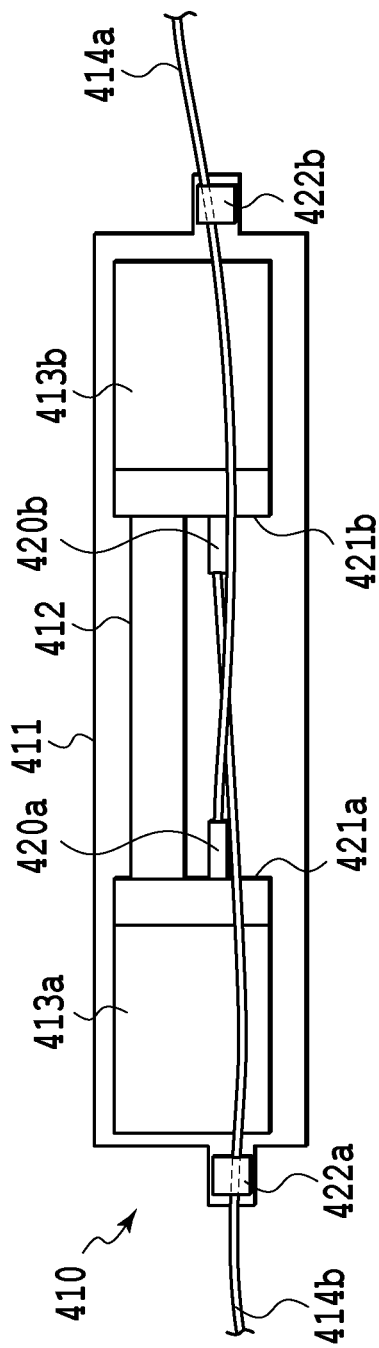
FIG. 5A illustrates the configuration of an optical module according to the fourth embodiment of the present invention.

FIG. 5A illustrates the configuration of the optical module according to the fourth embodiment of the present invention. The optical module of FIG. 5A is different from the optical module of the first embodiment in the existence of fiber connecting parts 420a and 420b connected to the silica-based PLCs 413a and 413b. The first embodiment has a configuration in which connecting parts to two optical fibers are provided at both ends sandwiching the LN modulator. The fourth embodiment has a different configuration in which connecting parts to two optical fibers are provided at the same side to the LN modulator 412.

The pipe sections 422a and 422b are provided at opposed surfaces of the package 411 as in the first embodiment. However, in contrast with the configuration of the first embodiment in which two optical fibers are taken out through openings provided at symmetric positions, the fourth embodiment has a configuration in which such openings are provided at symmetric positions of the opposed surfaces. Thus, the package can be easily manufactured and may be advantageously mounted in a board in the communication equipment.

Figure 5B:
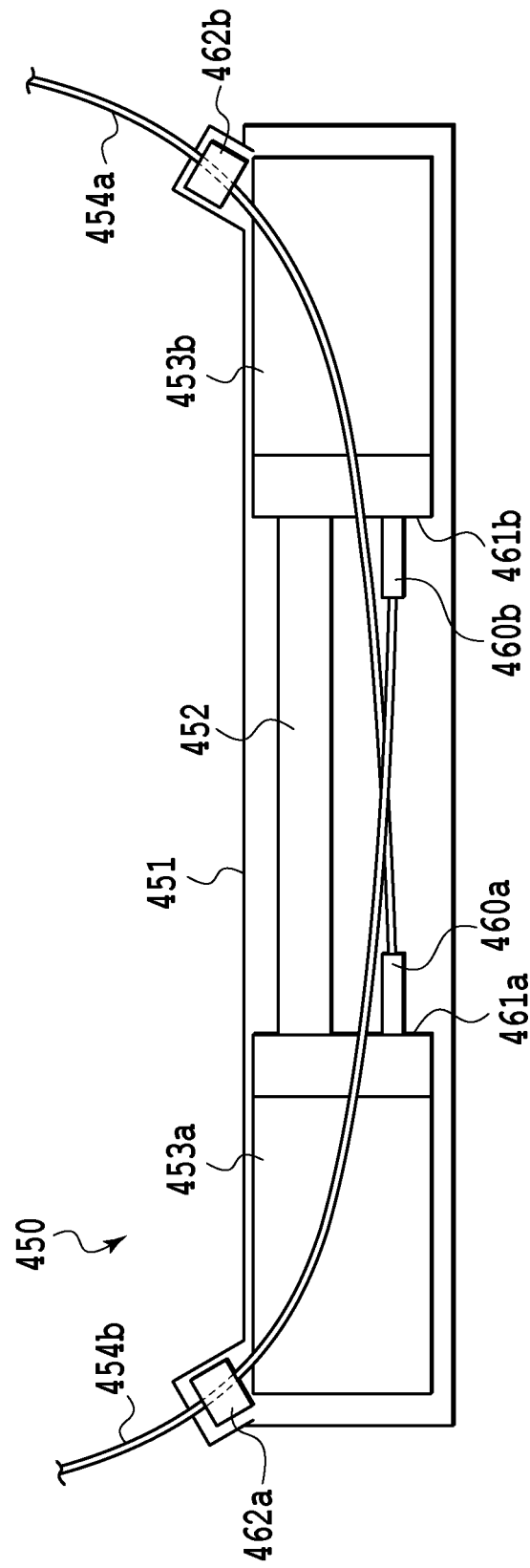
FIG. 5B illustrates a modified example of the optical module according to the fourth embodiment.

The optical module of FIG. 5B is configured so that two optical fibers are taken out through openings that are provided not in opposed surface (first surfaces) of the package 451 in the longitudinal direction but in side surfaces next to the first surfaces (second surfaces) in the vicinity of the first surfaces.

According to this configuration, the interior of the package 451 can be configured so that optical fibers 454a and 454b fixed between two connecting points can be subjected to a relatively-large radius bending. Thus, the same action by the buckling of optical fibers optical fibers can be achieved.

(Fifth Embodiment)

Figure 6A:
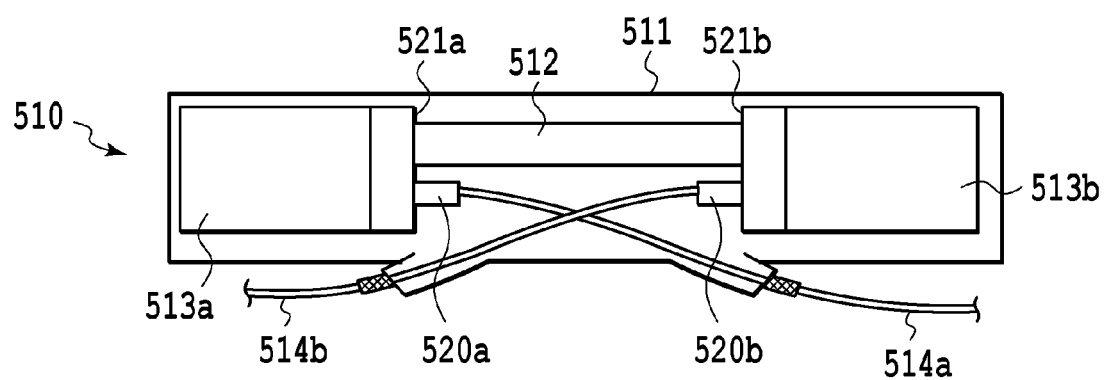
FIG. 6A illustrates the configuration of the optical module according to the fifth embodiment of the present invention.
Figure 6B:
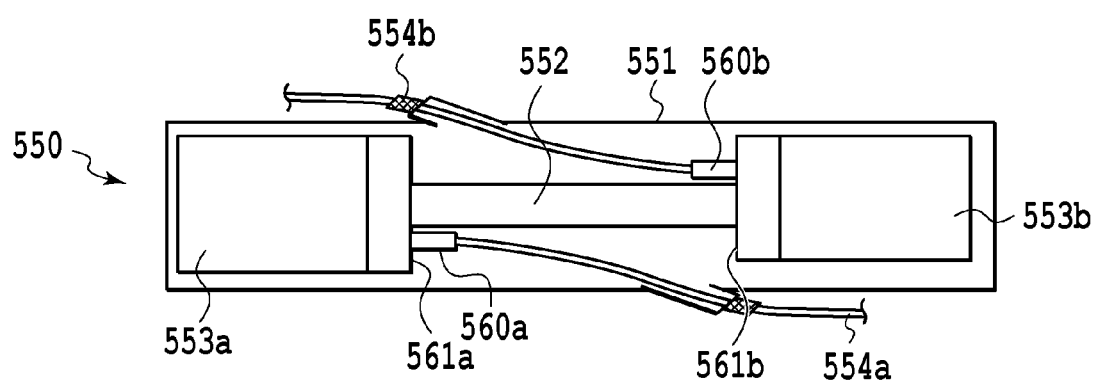
FIG. 6B illustrates a modified example of the optical module according to the fifth embodiment.

FIG. 6A and FIG. 6B illustrate the configuration of the optical module according to the fifth embodiment of the present invention. According to the fifth embodiment, two optical fibers are taken out through openings that are provided not in the opposed surfaces (the first surfaces) of the packages 511 and 551 in the longitudinal direction but in side surface(s) next to the first surfaces (second surface (s)) near the center of the package. FIG. 6A shows that openings through which the optical fibers are taken out are provided in the same surface of the second surface. FIG. 6B shows that openings through which the optical fibers are taken out are provided in the opposed surfaces of the second surfaces.

When this configuration is compared with those of the first to fourth embodiments, the length of the part required for the packages 511 and 551 can be further reduced. Furthermore, the installation in the board in the communication equipment can simplify the extra length processing of optical fibers during the connection to other devices, thus mitigating the mounting limitation.

(Mounting Method of Optical Module)

Next, the following section will describe the mounting method of the optical module according to this embodiment.

Figure 7A:
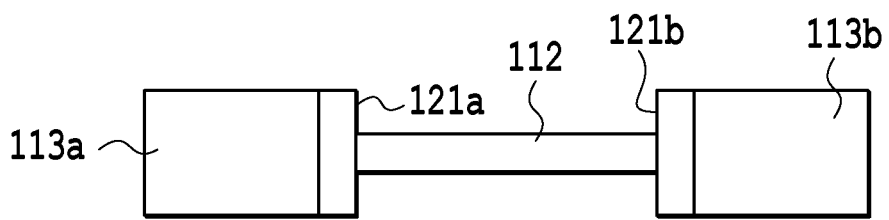
FIG. 7A illustrates the first example of the mounting method of the optical module according to the first embodiment.
Figure 7B:
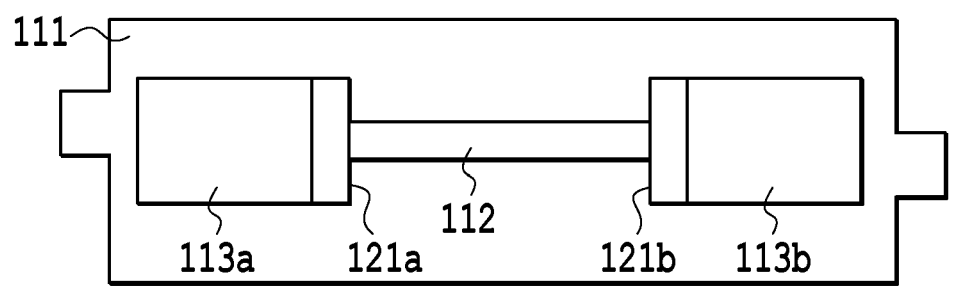
FIG. 7B illustrates the first example of the mounting method of the optical module according to the first embodiment.
Figure 7C:
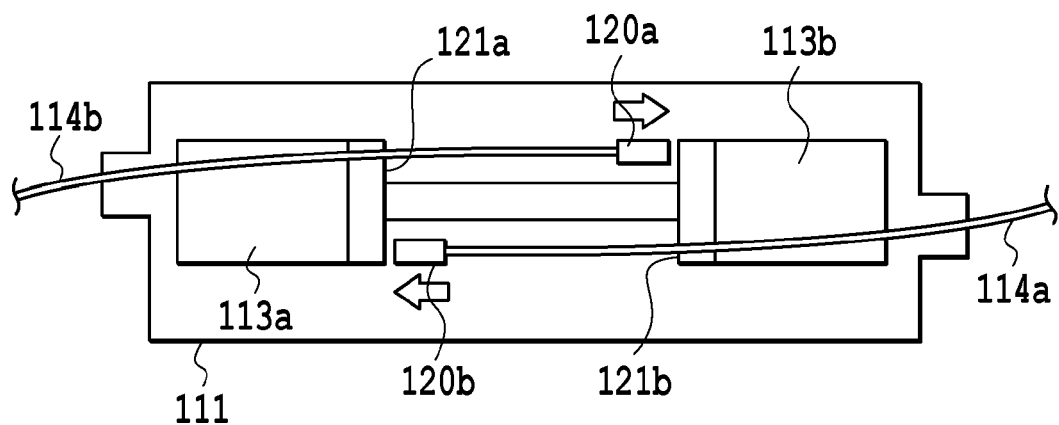
FIG. 7C illustrates the first example of the mounting method of the optical module according to the first embodiment.

FIGS. 7A to 7C illustrate the first example of the mounting method of the optical module according to the first embodiment. First, as shown in FIG. 7A, at the connection end faces 121a and 121b, the LN modulator 112 is fixed and integrated with the silica-based PLCs 113a and 113b. The integrated multi-chip integrated device is contained and fixed in the package 111 (FIG. 7B).

Next, as shown in FIG. 7C, optical fibers 114a and 114b having the connection end face fixed to the fiber connecting part are inserted through the pipe sections 122a and 122b of the package 111. At the connection end faces 121a and 121b, the fiber connecting parts 120a and 120b fixed to the optical fibers and the light waveguides of the silica-based PLCs 113a and 113b are aligned and fixed. Finally, the optical fibers 114a and 114b are fixed at the pipe sections 122a and 122b.

In the case of the conventional optical module, although a fiber extra length is provided between the pipe section of the package and the silica-based PLC, the length is about 10 mm and thus results in a space that is very small for connecting the fiber connecting part to the light waveguide, causing poor workability. According to this embodiment, the connecting points at the two points for fixing the optical fibers 114a and 114b have therebetween a long distance, thus providing remarkably-improved workability for connection.

Figure 8A:
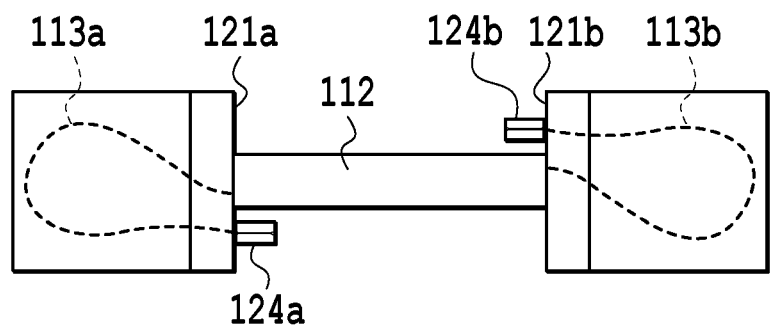
FIG. 8A illustrates the second example of the mounting method of the optical module according to the first embodiment.
Figure 8B:
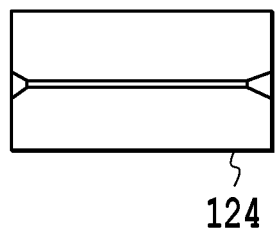
FIG. 8B illustrates the second example of the mounting method of the optical module according to the first embodiment.
Figure 8C:
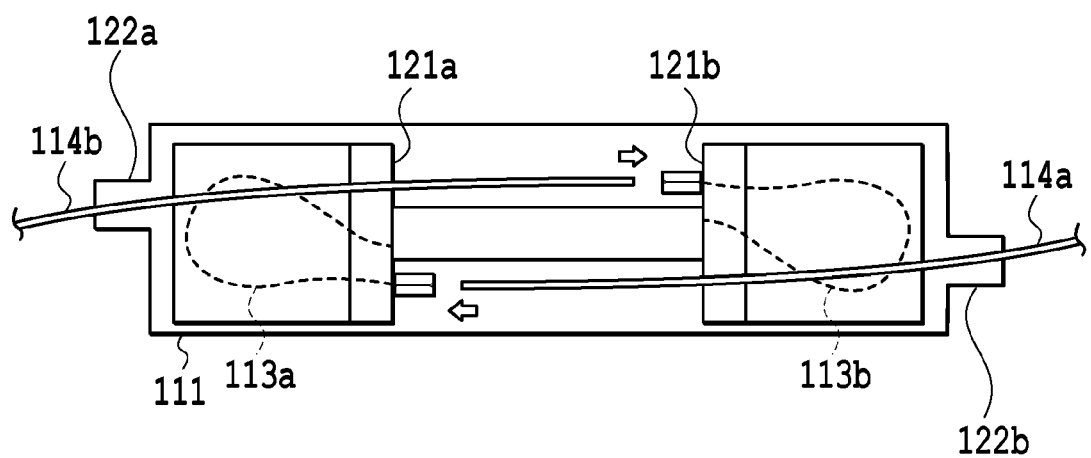
FIG. 8C illustrates the second example of the mounting method of the optical module according to the first embodiment.

FIGS. 8A to 8C illustrate the second example of the mounting method of the optical module according to the first embodiment. First, as shown in FIG. 8A, at the connection end faces 121a and 121b, the LN modulator 112z is fixed and integrated with the silica-based PLCs 113a and 113b. Furthermore, the connection end faces 121a and 121b are aligned with the light waveguides of the silica-based PLCs 113a and 113b in advance and then are fixed with the capillaries 124a and 124b.

The capillary 124 is a connecting part including a guide hole as shown in FIG. 8B so that an optical fiber can be inserted thereto (see for example Patent Literature 2). The multi-chip integrated device fixed and integrated with the capillary 124 is contained and fixed in the package 111.

As shown in FIG. 8C, the optical fibers 114a and 114b are inserted through the pipe sections 122a and 122b of the package 111 and are inserted to the guide holes of the capillaries 124a and 124b and are fixed. Finally, the optical fibers 114a and 114b are fixed at the pipe sections 122a and 122b.

According to this embodiment, the optical fibers 114a and 114b can be fixed without requiring an alignment operation in the package 111, thus achieving a significantly-reduced working time for connection.

Figure 9A:
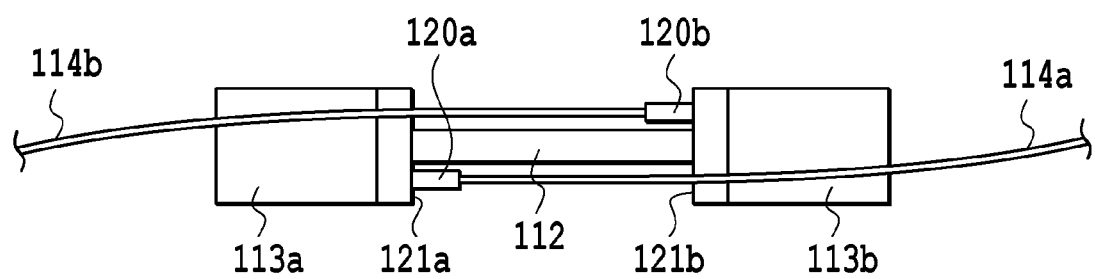
FIG. 9A illustrates the third example of the mounting method of the optical module according to the first embodiment.
Figure 9B:
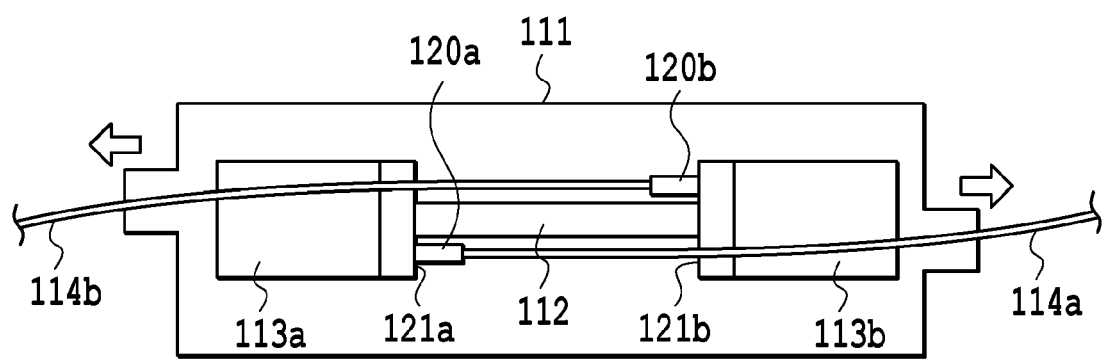
FIG. 9B illustrates the third example of the mounting method of the optical module according to the first embodiment.

FIGS. 9A and 9B illustrate the third example of the mounting method of the optical module according to the first embodiment. First, as shown in FIG. 9A, at the connection end faces 121a and 121b, the LN modulator 112 is fixed and integrated with the silica-based PLCs 113a and 113b. Furthermore, the optical fibers 114a and 114b having the connection end faces 121a and 121b fixed to the fiber connecting parts 120a and 120b are aligned with the light waveguides of the silica-based PLCs 113a and 113b in advance and are fixed. The multi-chip integrated device fixed and integrated with the optical fibers 114 are contained and fixed in the package 111.

As shown in FIG. 9B, the optical fibers 114a and 114b are inserted through the inner side of the package 111 to the pipe sections 122a and 122b and are drawn to the exterior of the package 111. When the PLC-LN modulator 110 is mounted on the board in the communication equipment, the optical fibers have a length of about 20-50 cm. According to this embodiment, since the connecting points at the two positions for fixing the optical fibers 114a and 114b have therebetween a long distance, the optical fibers can be sent through the pipe section easily.

(Sixth Embodiment)

Figure 10:
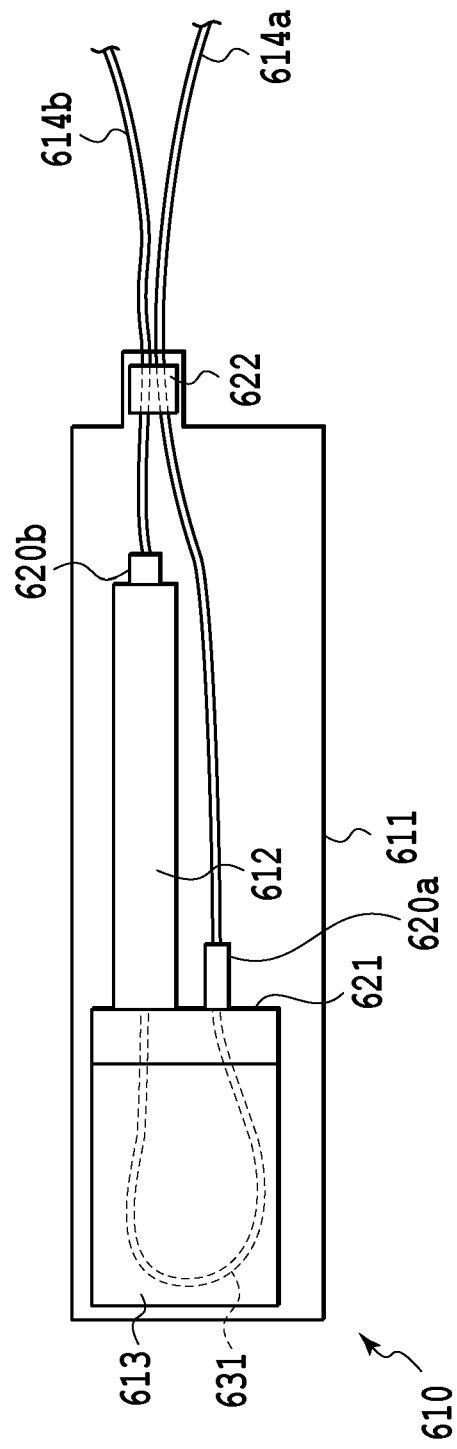
FIG. 10 illustrates the configuration of an optical module according to the sixth embodiment of optical module of the present invention.

FIG. 10 illustrates the configuration of the optical module according to the sixth embodiment of the present invention. A PLC-LN modulator 610 is a multi-chip integrated device in which a silica-based PLC 613 is connected and integrated with an LN modulator 612 and is contained in a package 611. The silica-based PLC 613 has a folded waveguide 631 for connecting the light waveguide formed in the LN modulator 612 to the optical fibers 614a. As a result, the LN modulator 612 connected to the silica-based PLC 613 and the optical fibers 614a fixed by the fiber connecting part 620a are connected by the same connection end face 621. On the other hand, an end face of the LN waveguide 612 opposed to the silica-based PLC 613 is connected to the optical fibers 614b integrated with the fiber connecting part 620b. The two optical fibers 614a and 614b are taken out from the pipe section 622.

In the case of the conventional 2 chip-type multi-chip integrated module, an end face opposite to the connection end face to the PLC and the modulator has connected optical fibers. Thus, two optical fibers were required to be taken out through the respective surfaces opposed in the longitudinal direction of the package. According to the sixth embodiment, the action as shown below can be achieved.

(1) The silica-based PLC 613 has the folded waveguide 631 having the radius R of about 2 to 3 mm. Thus, the silica-based PLC has a slightly-increased width. However, the need for a fiber extra length conventionally provided between the silica-based PLC and the pipe section can be eliminated by an amount corresponding to one end, thus achieving a package having a reduced length in the longitudinal direction (i.e., having a smaller size). For example, in one embodiment, in contrast with a conventional package accommodating a two chip-type multi-chip integrated module that has a length of 120 mm, the length can be reduced to 100 mm according to the sixth embodiment.

Furthermore, the same actions as (2) and (4) shown in the first embodiment can be provided. The action (3) shown in the first embodiment also can be provided by the increased distance between the connecting points for fixing the optical fibers 614a, thus achieving the reduced buckling amount of the optical fibers or the increased buckle bending radius.

Furthermore, according to the sixth embodiment, the package 611 has one pipe section 622 and the two optical fibers 614a and 614b can be taken out through the same surface of the package 611. Thus, the PLC-LN modulator 610 can be mounted on the board in the communication equipment while mitigating the mounting limitation on the connection with other devices.

The invention claimed is:

1. An optical module having a package containing a multi-chip integrated device integrated with an optical functional element having both ends connected to planar lightwave circuits (PLCs), the package having one or more pipe sections to which optical fibers are fixed,
wherein each of the PLCs includes a folded waveguide for connecting a light waveguide formed in the optical functional element to the optical fibers,
wherein the optical module comprises a connecting part connected to each of the PLCs for connecting the optical functional element to the optical fibers in the same face, and
wherein the optical fibers are taken out from opposed surfaces of the package.

2. The optical module according to claim 1, wherein the optical fibers are taken out from opposed surfaces of the package in a longitudinal direction.

3. The optical module according to claim 1, wherein the optical fibers are taken out from second surfaces that are next to first surfaces opposed to each other in the longitudinal direction of the package and that are in the vicinity of the first surfaces.

4. The optical module according to claim 1, wherein the optical fibers are taken out from the neighborhood of the center of second surfaces that are next to first surfaces opposed to each other in the longitudinal direction of the package and that are next to the first surfaces.

5. The optical module according to claim 1, wherein the optical functional element is any of silica glass material, dielectric material, semiconductor material, or organic material.

6. The optical module according to claim 1, wherein the PLC consists of silica glass material, the optical functional element is LiNbO$_3$, and the multi-chip integrated device is an optical modulator.

7. An optical module having a package containing a multi-chip integrated device integrated with an optical functional element having both ends connected to planar lightwave circuits (PLCs), the package having one or more pipe sections tom which optical fibers are fixed,
wherein a first PLC among the PLCs includes a folded waveguide for connecting a light waveguide formed in the optical functional element to the optical fibers,
wherein the optical module comprises a connecting part connected to the first PLC for connecting the optical functional element to the optical fibers in the same face,
wherein the optical fibers are taken out from the same surface of the package.

8. The optical module according to claim 7, wherein a second PLC among the PLCs includes a folded waveguide for connecting two light waveguides formed in the optical functional element.

9. The optical module according to claim 7, wherein the optical functional element is any of silica glass material, dielectric material, semiconductor material, or organic material.

10. The optical module according to claim 7, wherein: the PLC consists of silica glass material, the optical functional element is LiNbO$_3$, and the multi-chip integrated device is an optical modulator.

11. An optical module having a package containing a multi-chip integrated device integrated with an optical functional element connected to planar lightwave circuit (PLC), the package having one or more pipe sections to which first and second optical fibers are fixed,
  wherein the PLC includes a folded waveguide for connecting a light waveguide formed in the optical functional element to the first optical fiber,
  wherein the optical module comprises:
    a first connecting part connected to the PLC for connecting the optical functional element to the first optical fiber in the same face; and
    a second connecting part, in a face opposite to the face connected to the PLC of the optical functional element, for connecting a light waveguide formed in the optical functional element to the second optical fiber, and
  wherein the first and second optical fibers are taken out from the same surface of the package.

12. The optical module according to claim 11, wherein: the optical functional element is any of silica glass material, dielectric material, semiconductor material, or organic material.

13. The optical module according to claim 11, wherein: the PLC consists of silica glass material, the optical functional element is LiNbO$_3$, and the multi-chip integrated device is an optical modulator.

* * * * *